United States Patent Office 3,484,383
Patented Dec. 16, 1969

3,484,383
**EUROPIUM-ACTIVATED STRONTIUM MAGNE-
SIUM PYROPHOSPHATE PHOSPHORS**
Mary V. Hoffman, South Euclid, Ohio, assignor to General Electric Company, a corporation of New York
No Drawing. Filed Aug. 10, 1967, Ser. No. 659,611
Int. Cl. C09k 1/36
U.S. Cl. 252—301.6     4 Claims

ABSTRACT OF THE DISCLOSURE

The compounds $SrMgP_2O_7$, when activated with divalent europium, has been found to be a very efficient luminescent material or phosphor for the generation of ultraviolet light particularly useful for the diazo copying process. Substitutions of small amounts of Ca, Ba, or both for Sr, and of Zn for Mg, can be made without substantially altering the crystal structure or the luminescent output, except that Ca substituted for Sr gives a shift in the emitted color to longer wavelengths.

BACKGROUND OF THE INVENTION

This invention relates to luminescent materials particularly useful for the production of ultraviolet light when excited by 2537 A. radiation.

Activation with $Eu^{+2}$ has been known and reported for many phosphors. In strontium phosphates, it was reported by Nazarova (Izvest. Akad. Nauk. SSSR) Ser Fiz 25, 332–5, 1961, Chemical Abstract reference CA 55:19506e. She listed three binary compounds activated with $Eu^{+2}$ and gave the following emission peaks.

| | Angstroms |
|---|---|
| $Sr(PO_3)_2$:Eu | 4130 |
| $\beta Sr_2P_2O_7$:Eu | 4230 |
| $\alpha Sr_2P_2O_7$:Eu | 4150 |
| $Sr_3(PO_4)_2$:Eu | 4250 |

Of these, only $Sr_3(PO_4)_2$:Eu had reasonably good efficiency.

The $Sr_3(PO_4)_2$:Eu phosphor has been used in lamps for diazo copying. This process has many uses including making large positive prints of mechanical drawing in place of the old blueprint process. This phosphor is substantially faster than the standard phosphor known in the industry as BL/5, which is a lead-activated strontium barium magnesium silicate phosphor. However, even faster copying speeds are, of course, desirable.

SUMMARY OF THE INVENTION

Briefly stated, it has been found that $SrMgP_2O_7$:Eu can be efficiently activated with $Eu^{+2}$, and emits at 3930 A. when excited by 2537 A. radiation. It is also excited efficiently by 3650 A. radiation and by cathode rays. Some substitutions of other elements can be made in this compound without changing the crystal structure or harming the light output. Thus, the composition ranges of the compound of the invention are as follows:

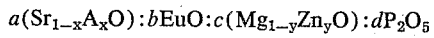

wherein A is at least one of Ca and Ba and $a$, $b$, $c$, $d$, $x$ and $y$ have molar values in the following approximate ranges:

$a$ is from 0.999 to 0.50,
$b$ is from 0.001 to 0.10,
$c$ is from 0.90 to 1.50,
$d$ is from 0.95 to 1.20,
$a$ plus $b$ plus $c$ equals approximately 2.0,
$x$ is from zero to 0.40, and
$y$ is from zero to 0.10.

In certain preferred compositions, $a$, $b$, $c$ and $d$ have values in the following ranges:

$a$ is from 0.995 to 0.80,
$b$ is from 0.005 to 0.05,
$c$ is from 1.0 to 1.2, and
$d$ is from 1.0 to 1.10.

One optimum composition has $a$, $b$, $c$, $d$, $x$ and $y$ values about as follows:

$a$ is about 0.98,
$b$ is about 0.02,
$c$ is about 1.10,
$d$ is about 1.10,
$x$ is zero, and
$y$ is zero.

Also, a preferred color shift is obtained by substituting Ca for about 20% of the Sr of the formula.

The $SrMgP_2O_7$ compound can be activatel with $Eu^{+2}$ and gives a peak emission at 3930 A., under 2537 A. excitation. Lamps utilizing $SrMgP_2O_7$:Eu phosphor were measured as having 140% of the speed of commercially available fluorescent lamps utilizing $Sr_3(PO_4)_2$:Eu and 225% of the speed of commercially available blacklight fluorescent lamps, measured in terms of relative speed of printing in the diazo process. The phosphor is also useful in other applications where ultraviolet emission is used, such as in exciting certain organic phosphors used in laundry markings or in decorative displays.

DESCRIPTION OF THE PREFERRED EMBODIMENTS

The phosphor $SrMgP_2O_7$:Eu can be prepared by firing in a mildly reducing atmosphere to insure the incorporation of europium in the divalent state rather than in the normal trivalent state.

The general formula for the phosphor has been stated above under "Summary of the Invention." Phosphors made at the extreme ends of the compositional ranges will have brightnesses of about two-thirds of the optimum compositions. Phosphors prepared at the extreme ends of the preferred compositional ranges will have brightnesses of about 90% of the best phosphor.

The composition limits which produce the brightest phosphors are determined by the behavior of the small amounts of impurity compounds remaining in the finished phosphor. The compound responsible for the fluorescence is $SrMgP_2O_7$. Other compounds which can also occur in the broad composition range include $Sr_2P_2O_7$ and $Sr_2Mg_3P_4O_{15}$; both of these will fluoresce with $Eu^{+2}$ activation, but at an undesirable wavelength for some applications. Another detrimental effect of the presence of these two compounds is that they compete with $SrMgP_2O_7$ for the $Eu^{+2}$ available when the phosphor is formed. If present in the finished phosphor, they will absorb some of the available incident exciting radiation. Both of these effects will result in lower efficiency for the $SrMgP_2O_7$ phosphor.

The presence of these extra compounds can be avoided by keeping $c$ and $d$ in the above-stated composition ranges at or above 1.0. The value of $b$ is largely determined by the desirability to use small amounts of $Eu_2O_3$, which is an expensive ingredient.

As materials to prepare the phosphor, one can use any of the available source of Mg, Sr and $P_2O_5$. These include Sr oxalate, $SrCO_3$, $SrHPO_4$, $MgNH_4PO_4 \cdot H_2O$, $Mg_3(PO_4)_2$, and magnesium carbonate; all of which can be prepared by well-known precipitation procedures and appropriate amounts of $Eu_2O_3$ and of $(NH_4)_2HPO_4$, if needed to form the $SrMgP_2O_7$ compound. The $Eu_2O_3$ can be used as the oxide or can be coprecipitated with strontium as the carbonate, the acid phosphate or the oxalate.

This method is advantageous because it improves the dispersion of the activator in the mixing operation.

$MgNH_4PO_4 \cdot H_2O$ can be prepared by a precipitation procedure adapted from the analytical method for the determination of Mg. In this procedure, a 1.1 molar solution of $(NH_4)_2HPO_4$ is added to an acidic one molar solution made from $MgSO_4 \cdot 7H_2O$, and the pH adjusted to about 2 to avoid precipitate formation. HCl can be used for the acidification. While the solutions are stirred, $NH_4OH$ is added to form the precipitate until the pH is 8 or 9. The precipitate is then washed by decantation, using ammoniated $H_2O$, filtered and dried at about 100° C. The ignition loss of the dried material should be 29% to 30%, giving the approximate formula of $$MgNH_4PO_4 \cdot H_2O$$

In order to prepare the phosphor, appropriate amounts of the starting materials are blended or mixed together. These are then heated to a temperature ranging from 600° C. to about 1075° C. for several hours, usually in air. Fused silica firing vessels are satisfactory. The temperature used will be determined by the starting materials used. When $(NH_4)_2HPO_4$, $SrCO_3$ and $MgNH_4PO_4 \cdot H_2O$ are used, it is preferred to initially fire for about two hours at a temperature in the range of about 500–600° C., or until a white body color is present throughout the fired cake. This causes the diammonium phosphate to react more completely, with less loss by volatilization which would occur by heating directly to higher temperatures. After this firing, the material is ground in a ball mill, such as to a particle size of 200 mesh or finer. The material is then reheated at a temperature between 950° C. and 1100° C. for several hours, in a mildly reducing atmosphere. Such an atmosphere is provided, for example, by mixing 0.1 to 1.0% $H_2$ with $N_2$. As specific examples, flowing atmospheres of about 0.2% $H_2$ in $N_2$ can be used. Higher $H_2$ contents or other combinations, such as $CO+CO_2$ are also useful to provide the reducing atmosphere. The result of this firing is to incorporate the activator in the matrix in the $+2$ valence state, giving rise to the ultraviolet emission.

As examples of methods which give good phosphors, the following procedures can be used.

EXAMPLE I

|  | Grams |
|---|---|
| 0.98 mole $SrHPO_4$ | 183.6 |
| 1.10 mole $MgNH_4PO_4 \cdot H_2O$ | 171.0 |
| 0.01 mole $Eu_2O_3$ | 3.52 |

These materials are blended together, and fired at 900° C. for 2 to 4 hours. The material is then ground in a ball mill and refired at 1075° C. for at least four hours in a flowing atmosphere of 0.2% $H_2$ in $N_2$. The product is then cooled in the same atmosphere. Using this procedure, the rate of reaction is slow, so that in order to obtain a phosphor which is completely reacted and of maximum brightness, the material may have to be ground and fired again in the reducing atmosphere. The product is a phosphor with a white body color and an emission at 3930 A.

EXAMPLE II

In order to utilize $(NH_4)_2HPO_4$ as a flux and to obtain a complete reaction and maximum brightness with less firing, the following procedure can be used.

|  | Grams |
|---|---|
| 0.98 mole $SrCO_3$ | 145.0 |
| 0.01 mole $Eu_2O_3$ | 3.52 |
| 1.10 mole $MgNH_4PO_4 \cdot H_2O$ | 171.0 |
| 1.10 mole $(NH_4)_2HPO_4$ | 144 |

These materials are blended together and then fired at 600° C. for two hours. They are then ball milled and refired at 1075° C. for four hours, in a flowing atmosphere of 0.2% $H_2$ in $N_2$. The material is cooled in the same atmosphere or in $N_2$. The result is a phosphor with a white body color which emits at 3930 A.

EXAMPLE III

As an example of a phosphor incorporating Ca substitutions, the following procedure can be used.

|  | Grams |
|---|---|
| 0.78 mole $SrCO_3$ | 114.5 |
| 0.20 mole $CaCO_3$ | 20.0 |
| 0.01 mole $Eu_2O_3$ | 3.52 |
| 1.10 mole $MgNH_4PO_4 \cdot H_2O$ | 171.0 |
| 1.10 mole $(NH_4)_2HPO_4$ | 144 |

These materials are blended together and then fired at 600° C. for two hours. They are then ball milled and refired at 1075° C. for four hours, in a flowing atmosphere of 0.2% $H_2$ in $N_2$. The material is cooled in the same atmosphere or in $N_2$. The result is a phosphor with a white body color which emits at 3980 A. If the formula is changed to incorporate 0.58 mole $SrCO_3$ and 0.40 mole $CaCO_3$, the resultant phosphor emits at 4020 A.

The stated substitutions can be made without substantially decreasing the brightness of the phosphor.

The phosphor is utilized by applying it in a fluorescent lamp by the conventional methods. These consist of suspending the phosphor in a suitable binder, coating the inside wall of the fluorescent bulb, drying the suspension and burning out the residue of the binder. The bulb is then made into a fluorescent lamp.

In the diazo application, the efficiency of the fluorescent lamp and the phosphor contained in them can be measured by the relative speed of the copying process. In this process, three types of papers are used, differing in their speed. The relative speeds of the phosphor of the invention are shown in Table I in comparison with standard blacklight phosphors and $Sr_3(PO_4)_2$:Eu. It is seen that phosphors of the invention are major improvements over phosphors of the prior art for diazo copying.

TABLE I.—DIAZO COPYING
[Relative speed based on fast paper with BL/5=100]

| Phosphor | Paper | Relative Speed |
|---|---|---|
| BL/5 | Fast | 100 |
|  | Medium | 78 |
|  | Slow | <60 |
| $Sr_3(PO_4)_2$: Eu | Fast | 159 |
|  | Medium | 100 |
|  | Slow | 60 |
| SrMgP$_2$O$_7$: Eu | Fast | 224 |
|  | Medium | 141 |
|  | Slow | 78 |

What I claim as new and desire to secure by Letters Patent of the United States is:

1. Luminescent material consisting essentially of the crystalline compound $SrMgP_2O_7$ activated with divalent europium, said luminescent material having the following compositional limits expressed in terms of the following formula:

$$a(Sr_{1-x}A_xO):bEuO:c(Mg_{1-y}Zn_yO):dP_2O_5$$

wherein A is at least one of Ca and Ba and $a$, $b$, $c$, $d$, $x$ and $y$ have molar values in the following approximate ranges:

$a$ is from 0.999 to 0.50,
$b$ is from 0.001 to 0.10,
$c$ is from 0.90 to 1.50,
$d$ is from 0.95 to 1.20,
$a$ plus $b$ plus $c$ equals approximately 2.0,
$x$ is from zero to 0.40, and
$y$ is from zero to 0.10.

2. Luminescent material according to claim 1 having a preferred composition wherein:

$a$ is from 0.995 to 0.80,
$b$ is from 0.005 to 0.05,
$c$ is from 1.0 to 1.2, and
$d$ is from 1.0 to 1.10.

3. Luminescent material according to claim 1 in which $a$ is about 0.98,
$b$ is about 0.02,
$c$ is about 1.10,
$d$ is about 1.10,
$x$ is zero, and
$y$ is zero.

4. Luminescent material according to claim 1 in which A is Ca and $x$ is about 0.20.

References Cited

UNITED STATES PATENTS 3,198,742   8/1965   Ropp _____ 252—301.4

FOREIGN PATENTS

Chemical Abstracts, vol. 55, 19,506(e) (abstract of V. P. Nazzarova—"Luminescence of Europium Activated Strontium Phosphate"—Izvest. Akad. Navk. SSSR), Ser Fiz 25, 332–5, 1961.

TOBIAS E. LEVOW, Primary Examiner

R. D. EDMONDS, Assistant Examiner

U.S. Cl. X.R.

252—301.4